Sept. 25, 1934.   H. D. WINTON   1,974,857
LIQUID DISPENSING APPARATUS
Filed June 3, 1930
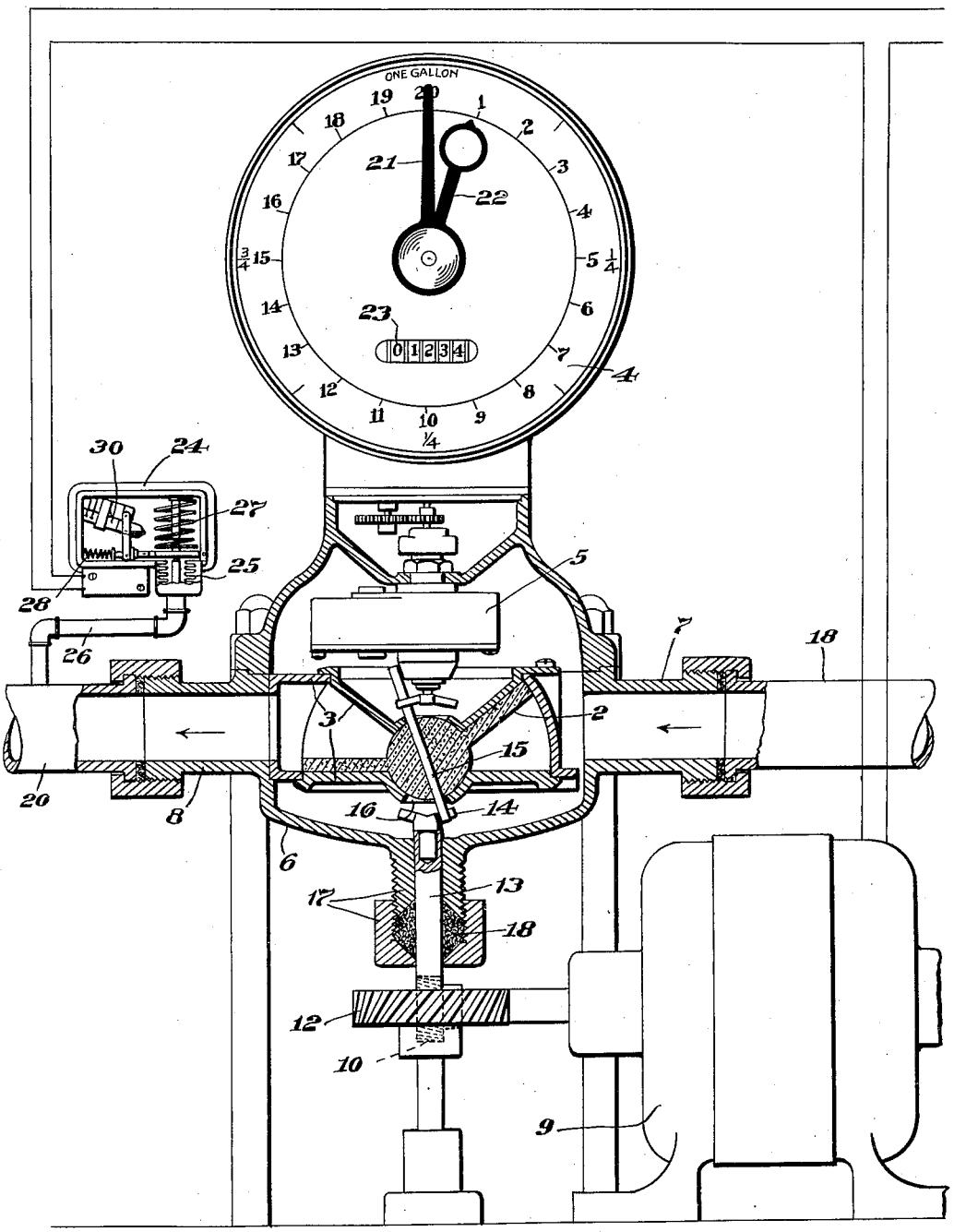
INVENTOR
Henry D. Winton,
BY
his ATTORNEY.

Patented Sept. 25, 1934

1,974,857

UNITED STATES PATENT OFFICE 1,974,857

LIQUID DISPENSING APPARATUS

Henry D. Winton, Wellesley, Mass., assignor to Hersey Manufacturing Company, South Boston, Mass., a corporation of Massachusetts Application June 3, 1930, Serial No. 459,049

6 Claims. (Cl. 221—95)

This invention relates to apparatus for pumping and measuring liquids and will be herein disclosed as embodied in an apparatus designed more especially for dispensing gasoline, light grades of fuel oil and similar liquids, it being understood, however, that the apparatus is also adapted for other uses.

It is the chief object of the invention to devise an apparatus of the general character indicated which will be simple and compact in organization and economical to manufacture, while still being reliable and convenient to operate.

The nature of the invention will be readily understood from the following description when read in connection with the accompanying drawing, and the novel features will be particularly pointed out in the appended claims.

The single figure of the accompanying drawing is a view, partly in vertical section and partly in side elevation, showing an apparatus constructed in accordance with this invention.

The organization shown comprises a pump and means for measuring the liquid pumped. As illustrated, it includes a nutating disk or piston 2 and a housing 3, commonly called a "chamber," in which the disk is operatively mounted. Registering or indicating mechanism 4 is arranged to be operated by the disk through reduction gearing, some parts of which are enclosed in the housing 5. The chamber 3 is operatively supported in a casing 6 provided with inlet and outlet nipples or connections 7 and 8, respectively. This part of the apparatus may be constructed, arranged and organized in a manner usual in water meters except for certain changes to be hereinfter described.

I have found that if the disk 2 is positively driven it can be made to perform not only its usual functions in a meter, but that it will also operate to pump the liquid through the chamber 3. The organization shown makes use of this fact.

For this purpose mechanism is provided for driving the disk 2, this mechanism, as shown, consisting of an electric motor 9, a worm 10 driven by said motor, a worm wheel 12 meshing with the worm, and a shaft 13 on which the worm wheel 12 is secured. A yoke 14 fast on the upper end of the shaft 13 engages the lower end of a spindle 15 and transmits the rotary motion of the shaft to the disk 2, the bottom of the chamber 3 being cut away, as indicated at 16, to permit the passage therethrough of the spindle 15. In this respect the meter construction has been modified somewhat. A further modification has been made also in that the bottom of the casing 6 is equipped with a stuffing box 17 through which the vertical shaft 13 extends, the packing 18 serving to prevent any material escape of liquid from the casing.

In using this apparatus to dispense gasoline, fuel oil, or the like, the inlet nipple or connection 7 is usually connected by a pipe 18 to a suitable tank or other source of supply, and the outlet nipple or connection 18 is coupled to a discharge pipe or hose 20. When the motor is started up it drives the disk 2, thus causing the disk to pump liquid from the supply through the chamber 3 and to deliver it through the discharge pipe or hose 20. The characteristic motion of the disk 2 is transmitted through the usual mechanism to the pointers 21 and 22 of the register or indicator. In the particular arrangement shown the pointer 21 makes one complete revolution for each gallon of liquid flowing through the casing, while the pointer 22 moves from one gallon designation on the dial to the next. Usually provision is made for re-setting the hands or pointers 21 and 22, and a totaling register 23 which cannot be re-set is also included in the indicating mechanism.

It is desirable to control the operation of the motor 9 automatically in accordance with the demands for the gasoline, fuel oil, or other liquid being pumped, and for this purpose a pressure responsive switch is connected in circuit with the motor 9, and is made subject to changes in pressure in the discharge pipe 20. The so-called Mercoid control may conveniently be used for this purpose and such an apparatus is shown in the drawing at 24. It comprises a flexible bellows 25 connected by a tube 26 to the hose or pipe 20. A spring 27 tends to compress the bellows, and when compressed it operated through a toggle mechanism, including the spring 28, to hold the mercury switch 30 in substantially the position shown in the drawing, the switch at this time being open. When the pressure in the pipe 20 rises and causes the bellows 25 to expand, the tube 30 is tipped into a position oppositely inclined to the position shown, where the body of mercury closes the contacts, thus closing the motor circuit and causing the motor to start up. Since this apparatus is well known no detailed illustration or description of it is required here.

The pipe or hose 20 is provided with a hand operated valve at its delivery end so that the hose or pipe normally is full of liquid under sufficient pressure to keep the switch 30 open. At this time, therefore, the motor 9 will be idle. When, however, the valve at the delivery end of the hose or pipe 20 is opened, the liquid will immediately start to run out, thus reducing the pressure in the pipe 20 sufficiently to cause the apparatus above described to close the switch 30 and start the motor into operation. This results in pumping liquid through the instrument or apparatus, and this pumping action continues until the desired quantity has been delivered, the attendant watching the register to determine when such quantity has been discharged. He then closes the valve at the end of the pipe, whereupon the pressure immediately builds up in the pipe and operates the Mercoid control to open the motor circuit and shut down the motor and the pump.

The apparatus thus is entirely automatic in its action, is extremely simple and compact in construction and can be manufactured economically.

While I have herein shown and described a preferred embodiment of my invention, it will be understood that the invention may be embodied in other forms without departing from the spirit or scope thereof.

Having thus described my invention, what I desire to claim as new is:

1. In a liquid dispensing apparatus, the combination of a liquid measuring device including a register and means including a disk for operating said register, a casing in which said disk is operatively mounted, said casing having inlet and outlet connections for receiving and discharging the liquid to be dispensed, a spindle rigid with said disk, means operatively connected with said spindle for driving said disk to pump the liquid through said casing, said register serving to indicate the volume of liquid so pumped, and mechanism responsive automatically to changes in the pressure of the liquid in said outlet connection for automatically starting and stopping said driving means.

2. In a liquid dispensing apparatus, the combination of a meter disk, a casing in which said disk is operatively mounted, a spindle rigid with said disk, an electric motor operatively connected with said spindle for driving said disk to cause it to pump liquid through said casing, a discharge connection through which the pumped liquid is discharged from said casing, registering mechanism driven by said disk and spindle for indicating the quantity of liquid so discharged, a switch for controlling said motor, and mechanism for automatically operating said switch in response to changes in pressure in said discharge connection.

3. In a liquid dispensing apparatus, the combination with a nutating meter disk and a chamber therefor, of a casing in which said disk and chamber are mounted, intake and discharge connections leading, respectively, to and from said casing, a spindle rigid with said disk, a shaft extending through the wall of said casing, an electric motor for driving said shaft, driving connections between said shaft and spindle for operating the disk and thereby causing it to pump liquid through said casing, mechanism for registering the quantity of liquid pumped into said discharge connection, said mechanism being operatively connected to said spindle and disk, and means for automatically controlling said motor in response to changes in pressure in said discharge connection.

4. In a liquid dispensing apparatus, the combination with a nutating meter disk and a chamber therefor, of a casing in which said disk and chamber are mounted, intake and discharge connections leading, respectively, to and from said casing, a shaft extending through the wall of said casing, an electric motor for driving said shaft, driving connections between said shaft and disk for operating the disk and thereby causing it to pump liquid through said casing, mechanism for registering the quantity of liquid pumped into said discharge connection, said mechanism being operatively connected to said spindle and disk, and a pressure responsive switch for automatically starting and stopping said motor in accordance with changes in pressure in the liquid in said discharge connection.

5. In a liquid pumping and measuring apparatus, the combination with a nutating meter disk and a chamber therefor, a casing in which said disk and chamber are mounted in a horizontal position, a vertical shaft extending through the bottom of said casing, an electric motor for driving said shaft, driving connections between said shaft and said disk for operating the disk to cause it to pump liquid through said casing, mechanism arranged to be operated by said driving connections and disk for registering the quantity of liquid so pumped, a pipe through which said pumped liquid is discharged from said casing, and a pressure responsive switch connected with said pipe for automatically starting and stopping said motor in response to changes in pressure in said discharged liquid.

6. In a liquid dispensing apparatus, the combination with a motor disk and a chamber therefor, of a casing in which said disk and chamber are mounted, intake and discharge connections leading, respectively, to and from said casing, a spindle rigid with said disk, a shaft extending through the wall of said casing, means for revolving said shaft, driving connections between said shaft and said spindle for revolving said spindle and thereby operating said disk to cause it to pump liquid through said casing, and registering mechanism driven by said spindle and disk for indicating the quantity of liquid so pumped.

HENRY D. WINTON.